Feb. 24, 1942.　　　J. W. WHITE ET AL　　　2,274,021
BRAKE
Filed June 3, 1938　　　2 Sheets-Sheet 1

INVENTORS.
JOHN W. WHITE
BY WILLIAM STELZER
Jerome R. Cox.
ATTORNEY.

Feb. 24, 1942.   J. W. WHITE ET AL   2,274,021
BRAKE
Filed June 3, 1938   2 Sheets-Sheet 2
FIG. 3
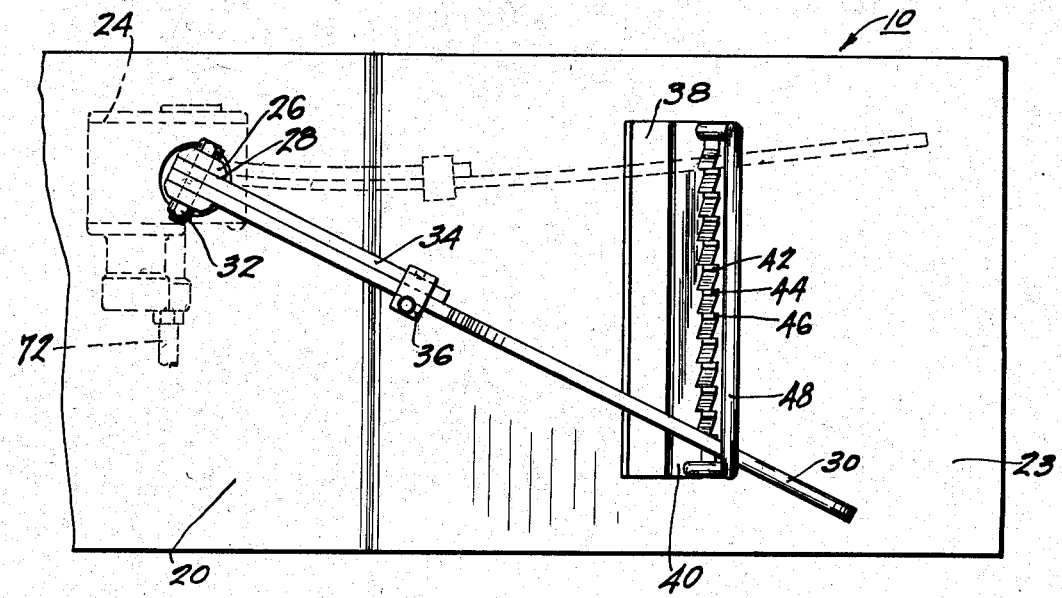
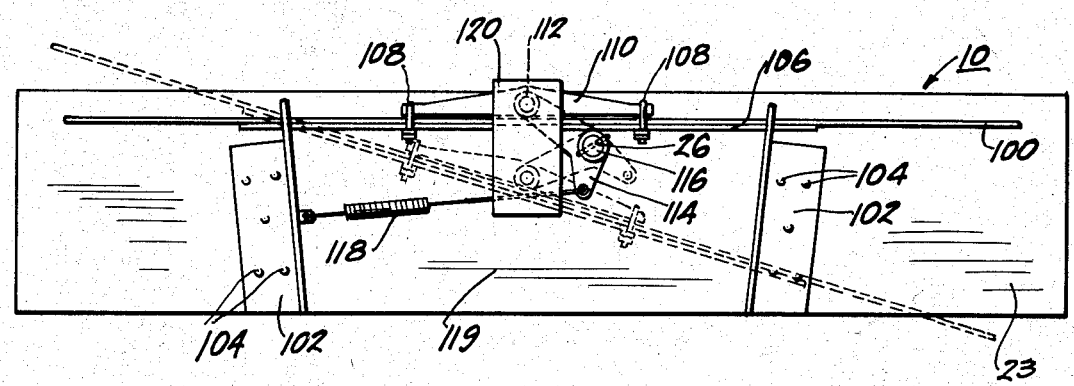
FIG. 4
INVENTORS.
JOHN W. WHITE.
BY WILLIAM STELZER.
Jerome R. Cox.
ATTORNEY.

Patented Feb. 24, 1942

2,274,021

UNITED STATES PATENT OFFICE 2,274,021

BRAKE

John W. White, South Bend, Ind., and William Stelzer, Detroit, Mich., assignors, by mesne assignments, to Bendix Aviation Corporation, South Bend, Ind., a corporation of Delaware Application June 3, 1938, Serial No. 211,554

6 Claims. (Cl. 188—153)

This invention relates to braking systems and more particularly to braking systems of the fluid pressure type adapted to be used especially with vehicles used in mines.

One object of this invention is to provide a fluid pressure braking system for a vehicle adapted to carry a considerable load and to so arrange the system that it may be manually operated by the attendant from the outside of the car.

A further object of the invention is to provide a manually controlled braking system of the fluid pressure type upon such a vehicle so constructed that the brake can be set for maximum braking for any desired length of time without danger of the conduits bursting due to the expansion of fluid in the cylinders. Although other uses of the system may be found, in the preferred embodiment it is shown as incorporated in a mine car. In such use the speed of the mine car being about two or three miles an hour permits the operator to walk at the side of his car and set the brakes either partially to retard the speed somewhat when descending a slope or to set them completely to stop the car. The hookup is so constructed that (inasmuch as the temperature within the mine is practically constant) the car can be left unattended with the brakes set without danger of the conduits bursting due to expansion of the fluid.

Another object of the invention is to provide a braking system having an actuating mechanism adapted to be operated either from one side of the car or from one of two sides of the car.

Other objects and desirable particular constructions and arrangement of parts will become apparent upon reference to the following detailed description of the two illustrative embodiments shown in the accompanying drawings, in which:

Figure 3 is a front elevational view of the mine car showing the lever and latch member for the operation of the system; and Figure 4 is a modification of Figure 3 showing the lever as being adapted to operation manually from either side of the car.

Figures 1, 2:
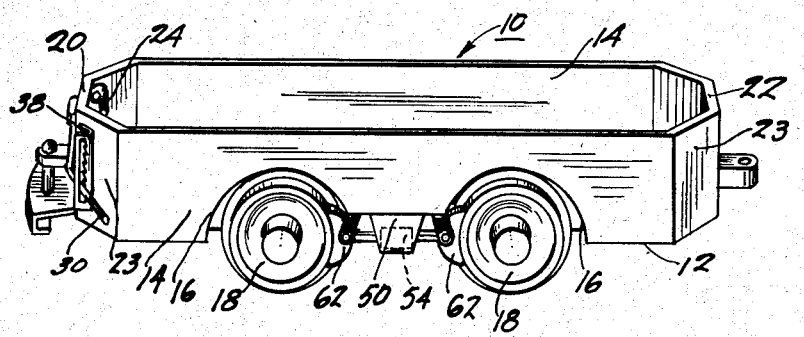
Figure 1 is a perspective view of a mine car embodying my novel braking system.
Figure 2 is a fragmentary side elevational view of the mine car with a cutaway portion showing the wheel cylinder.

Referring now to the drawings for a more detailed description of our novel braking system there is illustrated in Figure 1 a mine car indicated generally by the reference numeral 10 embodying our invention. The mine car 10 is constructed with a floor portion 12, and side walls 14 having recesses 16 therein so as to receive the wheels 18. To prevent the running of two or more of the cars into each other on a curved track when they are linked together the car is provided with outwardly extending portions 20 and 22 and receding portions 23 connected to the side walls 14.

The outwardly extending front portion 20 has suitably secured to itself at its inner side a master cylinder 24 having a shaft 26 (Figure 3) extending outward through the front portion 20. The outer end of the shaft 26 is formed with a transverse slot 28 receiving the operating lever 30. This lever is formed of spring steel for purposes later to be detailed. The lever 30 is secured within the transverse slot 28 by means such as a bolt 32 so that operation of the lever in an upward direction will actuate the master cylinder 24. By reason of this construction, it can also be moved laterally around the bolt 32 to allow engagement with or disengagement from the notches 42 etc. Also secured to the lever 30 within the slot 28 of the shaft 26 is a spring leaf 34 extending outwardly along the lever and suitably secured thereto by means such as a locking block 36. The leaf 34 aids the lever 30 when the latter is applied to its active position in taking a part of the lever load and preventing the latter from excessive bending or from snapping when it is bearing a substantial load.

In order that the brakes may be more easily held applied to substantially any degree at the wish of the operator whether it be merely to retard the speed somewhat or to apply the brake fully, an angle iron 38 is provided and suitably fastened to the front portion of the mine car 10. Because of the spring in the lever 30, the lever may be sprung over an extra notch in applying and will hold the brakes applied in spite of a slight decrease in volume of fluid due to drops in temperature. It will also take care of expansion of fluid due to increases in temperature. The outwardly extending portion 40 of the angle iron 38 is formed with steps or notches at regular intervals as shown at 42, 44 and 46 and has also associated therewith a bar or guide member 48 for the lever 30. The lever 30 passes within the guide member 48 and extends therethrough where it can be grasped by the operator and set to the step or notch desired and the guide member 48 acts to limit the outward travel of the lever 30 when it is being moved from one notch to another. Figure 3 illustrates the release or rest position of the lever in full lines and the fully applied position in dotted lines.

Depending from the central portion of the mine car between the wheels 18 is a flange 50 having an inwardly bent bottom portion 52 acting as a support for the wheel cylinders 54. The cylinders 54 may be securely fastened to the flange 50 by means such as a bolt 56. Suitably fastened to the floor 12 of the car 10 are supporting flanges 58 having pivotally connected thereto shoe hangers or links 60. The free ends of the links 60 are pivotally connected to shoes 62 by means such as pins 64.

Extending from the wheel cylinders 54 are push-rods 66 contacting the inner portions of the brake shoes 62 and adapted to transfer the pressure of the system against the shoes to brake and retard the rotation of the wheels 18. The push-rods 66 are provided with adjusting nuts 68 adapted to be connected to piston rods 67 to extend the rods so as to compensate for the wear of the shoes occasioned by constant braking. Urging the links 60 to bring the brake shoes 62 back to their normal position is a retractile spring 70. The force of this spring is overcome upon the actuation of the master cylinder 24 and the application of the brake shoes 62 against the wheels 18 by the push-rods 66.

The master cylinder 24 is provided with discharge conduits 72 communicating with the wheel cylinders 54 by means of ports 74 to supply the latter with fluid pressure to operate the system and apply the brakes. The operating lever 30 is shown in Figure 1 as being somewhat curved so as to cooperate with the portion 20 and receding portion 23 of the car.

As lever 30 is grasped by the operator and moved upwardly on the notches of the angle iron 38 the master cylinder 24 is actuated discharging the fluid through conduits 72 into the wheel cylinders 54 which in turn act upon the push-rods 66 causing them to extend and apply the brake shoes 62 to the wheels 18 against the action of the retractile spring 70.

In the modification of Figure 4 there is illustrated a lever 100 adapted to be operated from either side of the mine car 10. Suitably secured to the front portion 20 of the car 10 by means such as bolts 104 are angle irons 102 constructed in a similar manner as angle irons 38 of Figure 1 so as to permit the variable setting of the lever 100.

The lever has secured to itself an auxiliary spring leaf 106 serving the same purpose as rod 34 of Figure 3. Having suitably secured to itself by means such as U-bolts 108 at its center the lever 100 has a yoke arm 110 so constructed as to be capable of movement along with the lever 100 when the latter is actuated. Swiveled at 112 to the yoke arm 110 is a double end lever 114 having its main pivot 116 connected to the shaft 26 of the master cylinder 24 inside of the mine car 10 as illustrated in Figure 1. The free end of the lever 114 is connected by a retractile spring 118 to the angle iron 102 so that the spring urges the lever 100 to its normal position. Bent over the end plate 119 of the mine car and extending downwardly therefrom over the actuating linkage or mechanism is a plate 120 acting as a guide or shield for such mechanism.

In its operation as the lever 100 is grasped by the operator and moved downwardly to be seated in one of the notches formed in the angle iron 102, the yoke arm is carried along (dotted portion of Figure 4 of the lever 100) as is the double end lever 114 pivoting about its main pivot 116 and so rotates the shaft 26 of the master cylinder 24. The latter cylinder is actuated and the same manner of braking occurs as has been hereinabove described in detail. The operation in this modification is not limited to one side of the car but the same may be accomplished from either side by virtue of the extending lever 100.

While two illustrative embodiments have been described in detail, it is not our intention to limit the scope of the invention to those particular embodiments or otherwise than by the terms of the appended claims.

We claim:

1. In a braking system for a vehicle having wheels, a master cylinder at one end of the vehicle, wheel brakes having cylinders responding to the master cylinder, manually operable means for actuating the master cylinder comprising a spring lever extending crosswise of the end of the vehicle, and means mounted on the end of the vehicle having notched portions and a guide member to retain the manually operable means under tension at a predetermined position to maintain pressure on the master cylinder to hold the brakes applied.

2. In a braking system for a vehicle having wheels, an actuating means for said system comprising an actuating member outside of the vehicle operable at both of its ends, a yoke connected to said member, a double end lever connected to said yoke, and a master cylinder operated by said double end lever.

3. In a fluid braking system for mine cars and the like having wheels and a body, a master cylinder mounted within the body, brake members adjacent the wheels, slave cylinders to operate the brake members, means operatively connecting the master cylinder to the slave cylinders, means to operate the master cylinder comprising a stop member mounted on the outside of the body, and a resilient lever adapted to be interposed between the stop member and the master cylinder.

4. In a fluid pressure braking system for a vehicle having wheels and walls to constitute a compartment, a fluid pressure producing device within the compartment, a manually operative member actuating said device, means outside the compartment to retain the manually operative member in an applied position, and resilient means associated with said fluid pressure device and said actuating member allowing expansion and contraction of the pressure fluid while the said actuating member is retained in applied position.

5. In a braking system for a vehicle having wheels, a master cylinder, slave cylinders controlled by the master cylinder, and manual means including a resilient lever to actuate the master cylinder.

6. In a braking system for a vehicle having wheels, a master cylinder, slave cylinders controlled by the master cylinder, and manual means including a resilient lever to actuate the master cylinder, said resilient lever being adapted to maintain the pressure exerted by said master cylinder at a constant value.

JOHN W. WHITE.
WILLIAM STELZER.